United States Patent
Buzzell et al.

(10) Patent No.: US 6,280,670 B1
(45) Date of Patent: *Aug. 28, 2001

(54) POST- FORMING HEADS ON FASTENER ELEMENTS

(75) Inventors: Keith G. Buzzell, North Waterboro, ME (US); George A. Provost, Litchfield; Clinton Dowd, Goffstown, both of NH (US)

(73) Assignee: Velcro Industries B.V., Curacao (AN)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/916,241

(22) Filed: Aug. 22, 1997

(51) Int. Cl.$^7$ .............................. B29C 47/00; B29C 43/22
(52) U.S. Cl. ......................... 264/167; 264/40.5; 264/40.7; 264/146; 264/210.2; 264/210.5; 264/294; 264/296; 428/100; 428/119
(58) Field of Search ............................... 428/99, 100, 119; 264/146, 167, 177.1, 210.2, 210.5, 211.12, 284, 294, 296, 310, 40.5, 40.7

(56) References Cited

U.S. PATENT DOCUMENTS

| | | | |
|---|---|---|---|
| 2,820,277 | * | 1/1958 | Forster . |
| 3,031,730 | * | 5/1962 | Morin . |
| 3,192,589 | * | 7/1965 | Pearson . |
| 3,266,113 | | 8/1966 | Flanagan . |
| 3,718,725 | | 2/1973 | Hamano ................. 264/163 |
| 3,770,359 | | 11/1973 | Hamano ................. 425/305 |
| 4,454,183 | | 6/1984 | Wollman ................. 428/92 |
| 4,794,028 | | 12/1988 | Fischer ................. 428/100 |
| 4,861,399 | | 8/1989 | Rajala et al. ........... 156/66 |
| 4,955,113 | | 9/1990 | Rajala et al. ........... 24/448 |
| 5,260,015 | * | 11/1993 | Kennedy et al. ......... 264/167 |
| 5,505,747 | | 4/1996 | Chesley et al. . |
| 5,558,740 | * | 9/1996 | Bernard et al. ......... 156/231 |
| 5,607,635 | * | 3/1997 | Melbye et al. .......... 264/169 |
| 5,669,120 | * | 9/1997 | Wessels et al. ......... 24/446 |
| 5,679,302 | * | 10/1997 | Miller et al. .......... 264/167 |
| 5,690,875 | * | 11/1997 | Sakakibara et al. ..... 264/146 |
| 5,738,816 | * | 4/1998 | Tidemann et al. ....... 264/553 |
| 5,744,080 | * | 4/1998 | Kennedy et al. ........ 264/167 |
| 5,792,408 | | 8/1998 | Akeno et al. . |
| 5,795,535 | * | 8/1998 | Giovannone et al. ..... 264/551 |

FOREIGN PATENT DOCUMENTS

WO 92/04839   4/1992   (WO) .
WO 98/57564   12/1998  (WO) .
WO 98/57565   12/1998  (WO) .

* cited by examiner

*Primary Examiner*—Jill L. Heitbrink
*Assistant Examiner*—Mark Eashoo
(74) *Attorney, Agent, or Firm*—Fish & Richardson P.C.

(57) ABSTRACT

A method and apparatus of producing a fastener product having a multiplicity of fastening members with stems integrally molded with a strip-form base, along with a product and a preform product so produced. Molten resin is applied to a rotating mold roll having an outer surface for forming one side of the base, and a multiplicity of cavities extending inward from the outer surface for molding the stems. A preform product is stripped from the mold roll having a multiplicity of upstanding, preform stems extending from a side of the base. The preform product is passed through a post-forming nip between a heading roll and a backing member to form overhanging heads at the distal ends of the upstanding stems. The heading roll has a multiplicity of cavities about its periphery for forming the heads. Various means are disclosed for aligning the preform stems and the heading roll cavities. In another embodiment, a dimpled, heated heading roll is employed to post-form the stems to form fastener elements that extend in random directions.

41 Claims, 6 Drawing Sheets

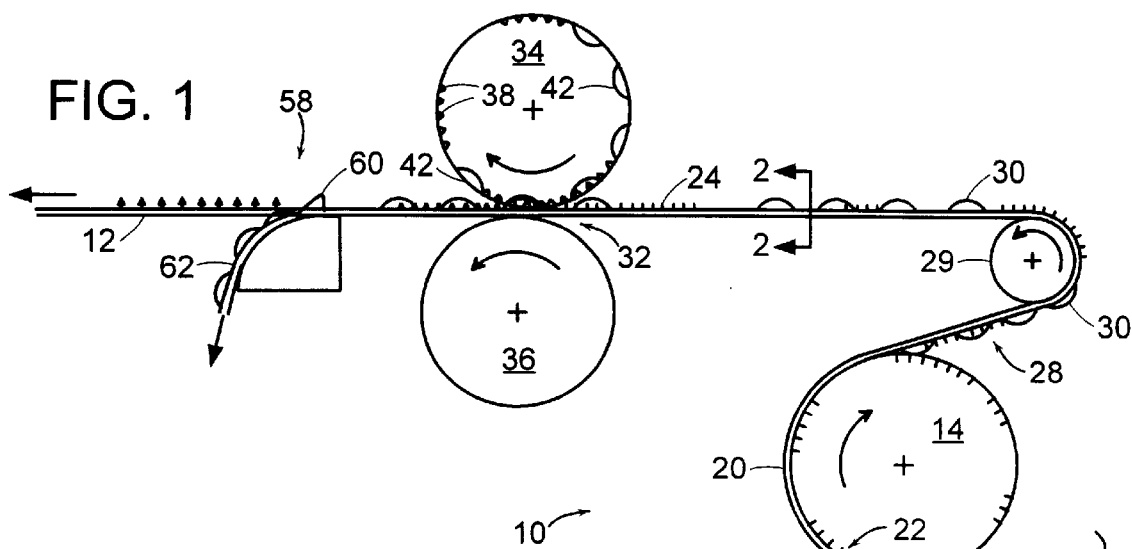
FIG. 1
FIG. 2
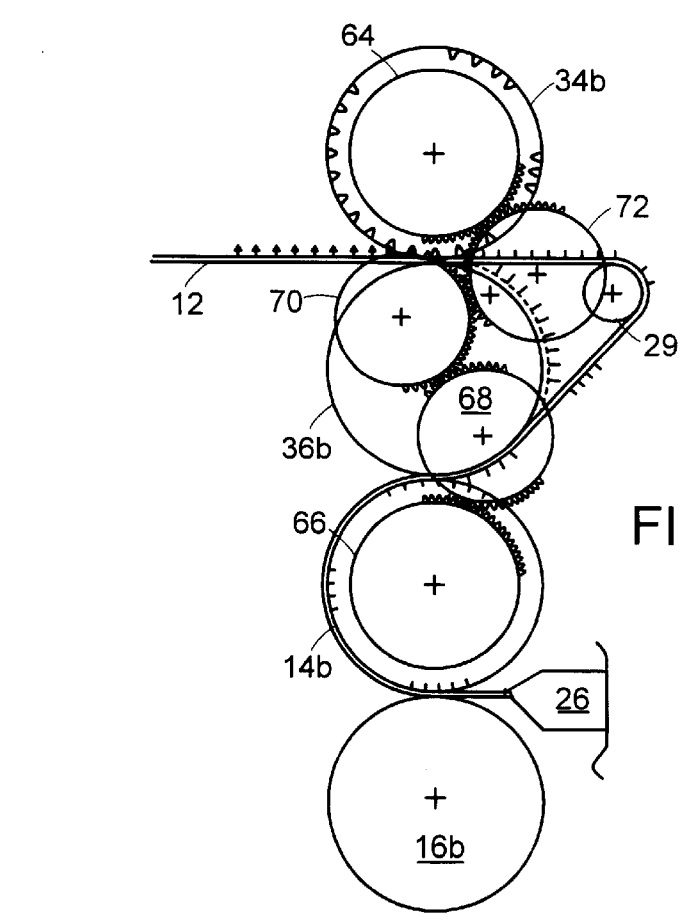
FIG. 5

POST- FORMING HEADS ON FASTENER ELEMENTS

BACKGROUND OF THE INVENTION

This invention relates to the continuous forming of fastener products with elements extending from a base, and has particular application to the production of fastener elements for touch fasteners and the like.

Some fastening elements are capable of engaging fibrous loops to form a fastening, while some are termed "self-engaging" as they are constructed and arranged to releasably engage similar fastener elements. Sometimes the latter are employed on fastening strips that are thereby looped to overlay, and fasten with, themselves.

Some fastening elements are hook-shaped, with distal ends that extend in discrete directions from their stems. Fastening elements with heads that overhang their stems generally equally in all directions are sometimes referred to as "mushroom" fastening elements. Some hook-shaped fastening elements have more than one distal end. Hooks with two oppositely-directed distal ends are sometimes called "palm-tree" hooks.

Hook-shaped fastener elements for touch fasteners and other products are effectively produced by the machine and method of Fischer U.S. Pat. No. 4,794,028, which is hereby incorporated by reference. In commercial production, fastener products are effectively produced in a continuous molding process employing a rotating mold roll. The mold roll has a large number of thin, disk-shaped mold rings and spacer rings which are stacked concentrically about a central barrel. At the periphery of the mold rings are hook-shaped cavities for molding the fastening elements. Molten resin is introduced to the surface of the mold roll and, under pressure, fills the cavities. The outer surface of the mold roll simultaneously forms one side of the strip-form base which, after being trained about the mold roll a sufficient distance and time to permit sufficient cooling of the resin, is stripped from the mold roll surface, pulling the formed fastener elements from their cavities without opening the cavities themselves.

Mushroom-type fastening elements are often produced by weaving a plastic fiber into a sheet form base to form a series of loops, cutting the loops to form stems, and melting the distal ends of the stems. In part because the plastic fiber (e.g., polypropylene) is a drawn fiber with high molecular alignment and residual strain along its axis, the molten resin of the stem ends draws back to form free-form, hemispherical heads overhanging the unmelted lower portions of the stems. Frequently the distal ends of the stems are melted by passing them near a hot wire or heated platen.

Because of their omni-directional overhanging portions, mushroom-type fastening elements are especially suitable for loop-engaging applications requiring shear strength in many different directions.

SUMMARY OF THE INVENTION

The invention features fastener elements produced by a method employing a rotating mold roll to mold preform stems extending from a strip-form base, and subsequently re-forming the distal ends of the stems in shaped cavities in a rotating heading roll to form engageable heads. The resulting fastener product is efficiently and cost-effectively produced in strip form in a continuous molding process.

According to one aspect of the invention, a method is provided for producing a fastener product having a multiplicity of fastening members with stems integrally molded with a strip-form base. The method comprises applying molten resin to a rotating mold roll having an outer surface for forming one side of the base, and a multiplicity of cavities extending inward from the outer surface for molding the stems; stripping from the mold roll a preform product having the strip-form base and a multiplicity of upstanding, preform stems extending from a side of the base; and passing the preform product through a post-forming nip between a heading roller and a backing member to form overhanging heads at the distal ends of the upstanding stems. The heading roller has a multiplicity of cavities about its periphery for forming the heads.

In one embodiment, the preform stems are registered with respect to the rotational position of the heading roll, such as by molding a alignment feature in the preform product with the mold roll and using the alignment feature to position the preform stems with respect to the rotational position of the heading roll.

In another embodiment, the rotational position of the heading roll is registered with respect to the preform stems, such as by mechanically coupling a registration means on each of the mold and heading rolls to register the rotational position of the heading roll with respect to the mold roll. This can include sensing (e.g., optically) an alignment feature of the preform product.

Generally, the cavities of the heading roller are substantially the shape of the formed heads. For instance, in one embodiment the formed, overhanging heads are of conical shape, having uppermost surfaces forming apices. The apices each preferably define an included angle of less than about 90 degrees, more preferably less than about 60 degrees.

The heading roll should be maintained at an elevated temperature to soften the distal ends of the upstanding stems of the preform product.

Preferably, the formed, overhanging heads each overhang their respective stems in elevational view by an overhang distance of at least about 25 percent (more preferably, at least about 50 percent) of the width of their respective stems.

After passing the preform product through the post-forming nip, the strip-form base can be trimmed between the alignment feature and the fastening members to produce a strip-like fastener product without the alignment feature.

The cavities of the mold roll can have many different shapes. For instance, in one embodiment the cavities of the mold roll comprise cylindrical holes extending inward from the surface of the mold roll. In another embodiment, the cavities of the mold roll comprise axial slots extending through the peripheral edges between broad sides of disk-form mold plates.

In one embodiment, the cavities of the heading roll are arranged to randomly intercept the preform stems. At least some of the preform stems may be bent by the heading roll to form hook-shape fastener elements, with at least some of the preform stems being headed by the heading roll without being bent. Preferably, the preform stems are arranged in spaced, parallel rows extending in the machine direction and the cavities of the heading roll have an overall depth of less than about 0.5 times the spacing between adjacent, machine direction rows of stems. Adjacent cavities of the heading roll are preferably spaced at a cavity spacing distance of less than about 0.8 times the spacing between adjacent, machine direction rows of stems.

In one configuration, the cavities of the heading roll extend into the heading roll from rectangular bases, the bases of the heading roller occupying at least 90 percent of the circumferential area of the heading roll along the length of the cavity portion (i.e., the length of the roll having cavities) of the heading roll.

According to another aspect of the invention, an apparatus is provided for performing the above-described method. The apparatus has a rotating mold roll having an outer surface for forming one side of a strip-form base, and a multiplicity of cavities extending inward from the outer surface for integrally molding stems extending from the base. Also included is means for applying molten resin to the mold roll, and a heading roll having a multiplicity of cavities about its periphery for forming heads on the preform stems to form fastener members.

The apparatus preferably includes means for aligning the preform stems with the heading roll. Such means can include means for registering the preform product to the heading roll, such as by interlocking alignment features molded into the preform product. Alternatively, the alignment means can register the rotational position of the heading roll to the preform product, such as by controlling the rotation of the heading roll based upon sensed alignment features of the preform product.

For instance, in one embodiment the rotating mold roll has an alignment feature cavity extending inward from its outer surface for integrally molding an alignment feature with the strip-form base. The heading roll, in this case, can have a corresponding cavity extending inward from its outer surface for cooperating with the alignment feature to align the preform stems and the heading roll. In one instance, the alignment feature and the cavity extending inward from the outer surface of the heading roll are both of generally conical shape.

In some cases the apparatus includes a means for detecting the alignment feature for aligning the rotational position of the heading roll with the preform stems. Among other things, this detection means can include an optical sensor. The heading roll has, in some cases, an inwardly-extending groove in its outer surface for cooperating with the alignment feature to keep the strip-form base aligned along the axis of the heading roll.

In a presently preferred embodiment, a backing member (such as a rotatable backing roll) defines a gap with the heading roll. The heading roll and backing member are arranged such that heads are formed on the preform stems as the strip-form base passes through the gap. The backing roll can be arranged in close proximity with the mold roll, such that the strip-form base is trained about the backing roll after leaving the outer surface of the mold roll and before passing through the gap between the backing and heading rolls.

In another embodiment, the apparatus includes means for mechanically coupling the mold roll and the heading roll (such as a gear train), to register the rotational position of the heading roller with respect to the rotational position of the mold roll.

In some embodiments, a trimming station is provided for trimming the strip-form base between the alignment feature and the fastening members to produce a strip-like fastener product without the alignment feature.

When post-forming without aligning the cavities to the stems, using a mold roll having mold plates arranged to form parallel rows of spaced preform stems extending about the circumference of the mold roll, the spacing of stems of adjacent rows are preferably offset such that the stems are not aligned across the mold roll. In such cases the cavities of the heading roll are preferably arranged in rows that extend across the roll, with adjacent rows of heading roll cavities being offset such that the cavities are not aligned about the circumference of the heading roll. This configuration helps to randomize the directions of the final fastener elements.

According to another aspect of the invention, a multi-lobal fastener element has a molded, elongated stem extending from a base end to a distal end. The stem has multiple, outwardly-projecting ridges extending along its length, such that the stem has a polygonal cross-section. A molded, overhanging head is formed at the distal end of the stem, the head having multiple lobes corresponding to the ridges of the stem.

According to yet another aspect, the invention provides a preform fastener product having a molded, strip-form base having two broad surfaces, an array of upstanding fastener element stems extending from a broad surface of said base, and a row of alignment features integrally molded with and extending from the base for locating the upstanding fastener element stems for post-forming heads on the stems.

As provided by the invention, mushroom-type fastening elements with pointed heads can be efficiently molded in a continuous production process from many different materials. The cross-sectional configuration of the stems may be readily optimized for a given application by changing the shape of the stem molding cavities in the mold roll. The head shape, likewise, is determined by the shape of molding surfaces and is not limited to shapes formable by free-form melting. For example, stems may be molded with tapering sides to provide a high bending resistance for applications having high direct engagement forces or for resisting high shear loads. The low residual stresses in the stem surfaces, as a result of being formed at elevated temperatures, can be especially advantageous for resisting cyclic loads with lower rates of fatigue failure.

BRIEF DESCRIPTION OF THE INVENTION

FIG. 1 is a schematic representation of a first apparatus for continuously producing a strip-form fastener product.

FIG. 2 is a cross-sectional view, taken along line 2—2 in FIG. 1.

FIG. 5 shows a second apparatus for continuously producing a strip-form fastener product.

DESCRIPTION OF THE PREFERRED EMBODIMENTS

Figure 1A:
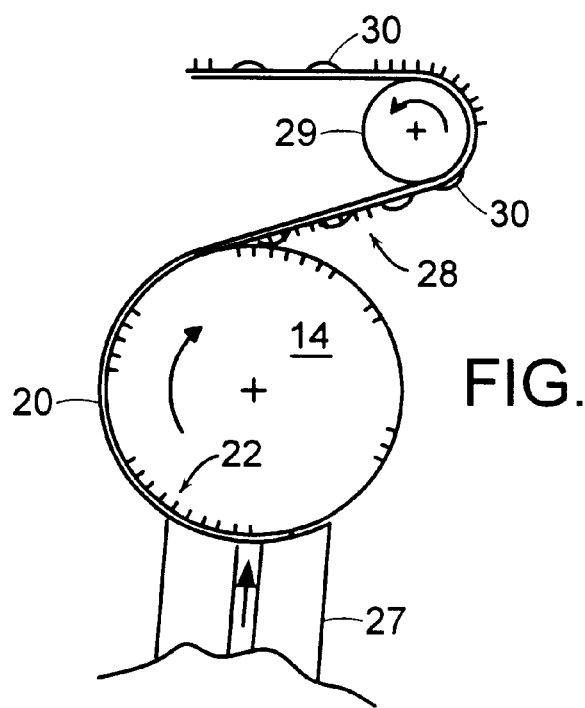
FIG. 1A illustrates a variation of the apparatus of FIG. 1.

Referring to FIG. 1, a molding system 10 is constructed to continuously mold a strip-form fastener product 12. The system has a rotating mold roll 14 and a rotating pressure roll 16, between which a nip 18 forms the thin, strip-form base 20 of the fastener product. Mold roll 14 has several rows of cavities 22 extending inwardly from its outer surface for molding an array of very small stems 24 integrally with base 20. An extruder 26 provides molten resin to nip 18, in which pressure between mold roll 14 and pressure roll 16 fills cavities 22. As the resin travels about the mold roll from nip 18, it sufficiently cools that a preform fastener product 28 is readily peeled from the surface of the mold roll and passed about an idler roll 29. Other means of applying molten resin to the mold roll may also be used, such as the extrusion head 27 of FIG. 1A, which applies resin under pressure directly to the surface of the mold roll.

Of particular note with respect to this invention, mold roll 14 also has cavities for molding a series of registration bumps 30 on either side of preform product 28 (see also FIG. 2). Although shown sporadically in the figure, it should be understood that stems 24 and registration bumps 30 typically have a repeating, regular pattern.

After leaving idler roll 29, preform product 28 is passed through a nip 32 between a rotating post-forming roll 34 and a backup roll 36, in which the distal ends of stems 24 are re-formed into overhanging heads. The strip-form product with headed stems is then trimmed to remove the edge regions having the registration bumps 30, to produce the finished fastener product. With appropriate materials, the trimmed edges may be reground and recycled.

It should be understood that, although only stems and registration bumps are referred to, mold roll 14 and/or pressure roll 16 can be adapted to also form other features on the surface of the base of the preform fastener product, such as strengthening ribs or bumps, splitting channels, text or graphics, or other features.

For forming heads on stems 24, post-forming roll 34 has head-shaped cavities 38 at its surface, arranged to encounter and re-form the distal ends of the stems. In this embodiment, registration bumps 30 are employed (as described below) to maintain the alignment of cavities 38 and stems 24, such that the entering stems pass through nip 32 substantially aligned with respective cavities 38. The surfaces of cavities 38 are maintained at an elevated temperature to soften the resin of the distal ends of the stems to allow it to flow, under the pressure of the post-forming roll, to produce an overhanging head (such as that shown in FIG. 6). Proper spacing of cavities 38 on the post-forming roll, in both machine and cross-machine directions, must account for linear shrinkage or demolding stretch of the molded base between the mold roll and the post-forming roll, and will in most cases need to be slightly different than the spacing of the stem-forming cavities of the mold roll.

Figure 3:
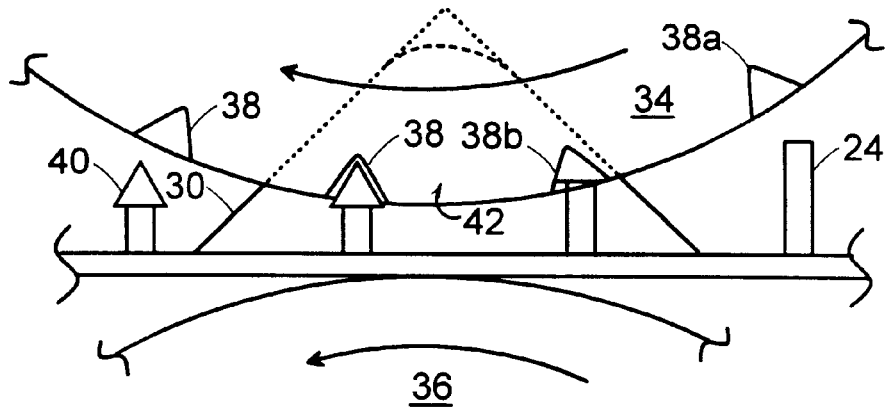
FIG. 3 is an enlarged view of the post-forming nip of FIG. 1.

Although not to scale, FIG. 3 illustrates the post-forming of the distal ends of stems 24 by post-forming roll 34. A stem (e.g., stem 24, of sufficient length to contain enough material to form the finished fastener element) entering the nip is aligned with a head-shaped cavity (e.g., cavity 38a) in the post-forming roll. As the cavity nears the center of the nip (e.g., cavity 38b) it softens and re-forms the end portion of the stem into a desired shape, preferably having a portion that overhangs the lower sides of the stem, as shown. Leaving the nip, the formed head is pulled from its cavity, producing a fully-formed, functional fastener element 40.

In the embodiment illustrated, post-forming roll 34 also has registration cavities 42 (FIG. 1) that correspond to the registration bumps 30 of the preform product. The registration bumps, in this case, maintain the alignment of head-shaped cavities 38 with stems 24 by forcing the preform tape to feed into the nip at the proper rate and position to line up the stems with the head-shaped cavities.

Figure 4:
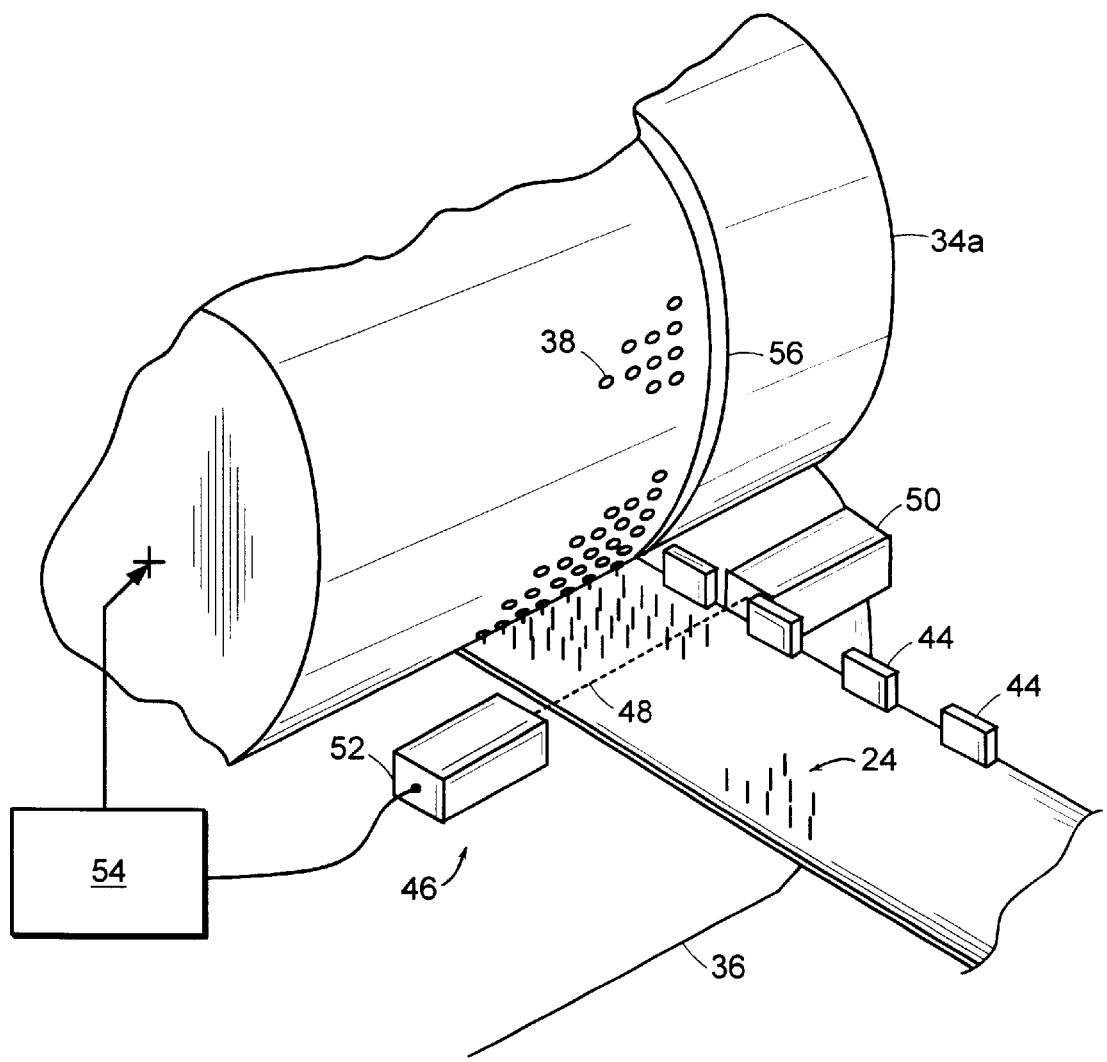
FIG. 4 illustrates a means of aligning preform stems and heading roll cavities.

In another embodiment illustrated in FIG. 4, the registration bumps (or stems 24 or other appropriately shaped, molded features of the hook tape) are sensed by a feature-sensing system, such as an optical detection system 46, for controlling the rotation of post-forming roll 34a. A beam 48 of light from an emitter 50 is sensed by a receiver 52, except when the beam is blocked by molded blocks 44. Based on a signal received from receiver 52, controller controls the rotation of post-forming roll 34a, accelerating or decelerating the roll as required to achieve the desired alignment of cavities 38 and stems 24. Molded blocks 44 cooperate with a groove 56 in the outer surface of roll 34a to keep the preform product aligned with the rolls along in the cross-roll (i.e., cross-machine) direction.

Referring back to FIG. 1, after the post-forming operation the strip-form product is passed through a trimming station 58 where the registration bumps are trimmed from the final product. A splitting edge 60, for instance, may be employed to continuously separate the edges of the product having the registration features from the portion having fastener elements. Where applicable, the trimmed edges 62 are returned to a hopper to be reground and recycled through the system.

In another embodiment shown in FIG. 5, post-forming roll 34b and backup roll 36b make up, along with mold roll 14b and pressure roll 16b, a stack of four rolls. Post-forming and mold rolls 14b and 34b are fitted with gears 64 and 66, respectively, for maintaining the timing of the rolls. Intermediate gears 68, 70 and 72 form a gear train for simultaneously driving both the mold and post-forming rolls. Because the alignment is maintained by the mechanical linkage between the mold and post-forming rolls, no registration bumps are employed. This technique of maintaining roll registration is particularly suitable for molding products whose preforms are not significantly stretched while being peeled from the mold roll or while passing about idler 29, or that demonstrate a consistent and predictable stretch, such that the spacing of cavities 38 on the post-forming roll can be arranged to account for the stretching of the tape. Instead of routing the preform tape about idler 29, the tape may be left on the surface of backup roll 36b to reduce the tendency for the tape to be stretched before post-forming (as shown, for instance, by dashed lines in FIG. 5). A vacuum system, for instance, may be employed internal to backup roll 36b from the molding nip (with roll 14b) to the post-forming nip (with roll 34b) to help extract stems 24 from cavities 22 in mold roll 14b, and pass the tape to post-forming roll 34b, without significant stretching of tape base 20.

Many different shapes of fastener elements are readily formed with the above-described method and apparatus. The shape of the elements is determined, in part, by the shape of the stems (e.g., stems 24 of FIG. 1) molded in the mold roll, and by the shape of the heads formed by the post-forming roll. In one preferred embodiment, round stems are molded in cylindrical (slightly tapered for release) cavities in the mold roll and are subsequently post-formed to produce substantially conical heads having rounded sides. Photo-chemical etching techniques, for instance, may be employed to form such cylindrical cavities between adjacent plates in the mold roll. Such techniques are described in copending U.S. application Ser. No. 08/659,368, filed Jun. 6, 1996 and hereby incorporated by reference. Cylindrical stem-forming cavities can also be produced by drilling directly into the surface of an outer sleeve of the mold roll, such as with a laser or mill. An example of a fastener element formed from a round stem is shown in FIG. 6 and described in detail below.

Figure 12:
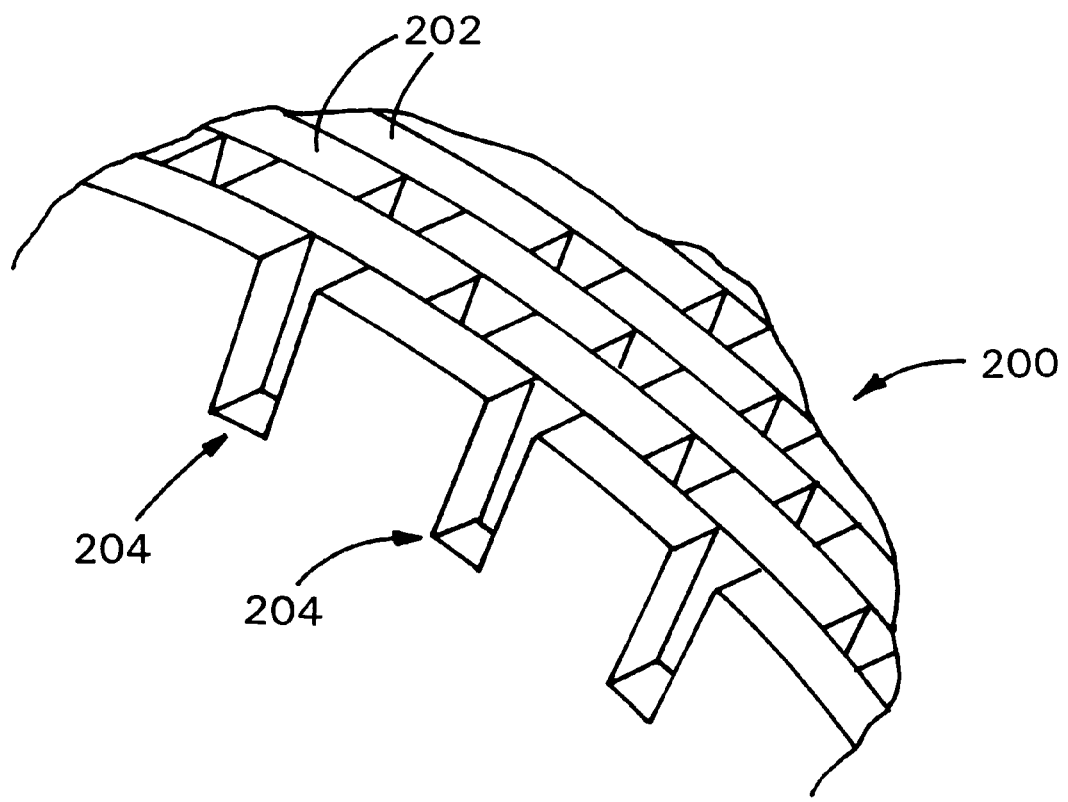
FIG. 12 shows mold cavities as axial slots between broad sides of disk-shaped mold plates.

Alternatively, referring to FIG. 12, stems of square or rectangular cross-section are readily formed in rolls formed by a stack 200 of multiple mold plates 202 such as those described, for instance, by Fischer in U.S. Pat. No. 4,794,028. Straight slots 204 cut through the thickness of a single plate, when sandwiched between sides of adjacent plates, form such "square" cavities and produce, for example, fasteners such as that shown in FIG. 7.

Figure 6:
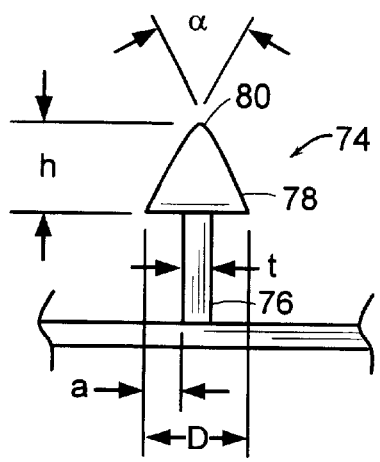
FIG. 6 is an enlarged elevational view of a first fastener member formed according to the invention.

Referring to FIG. 6, an example of the types of fastener elements readily formed with the method described herein is a mushroom-shaped element 74, having a round stem 76 and a head 78. The sides of head 78 extend upward to an apex 80, which defines an included angle α of about 60 degrees. The thickness, t, of stem 76 is about 0.015 inch and corresponds substantially to the diameter of the preform stem from which the fastener element was formed. Head 78 extends a radial distance, a, of about 0.015 inch from stem 76, such that the head diameter, D, is about 0.045 inch. The overall height, h, of head 78 is about 0.039 inch.

Figure 7:
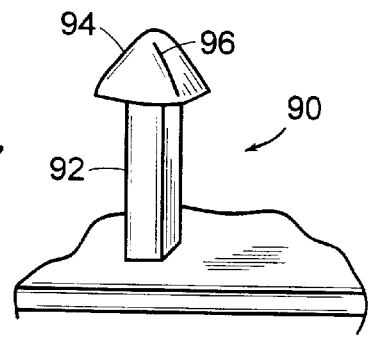

Referring to FIG. 7, a fastener element 90 has a stem 92 of square cross-section and an overhanging head 94. Head 94 has generally flat sides, defining rounded edges 96 between them and giving the head a somewhat pyramid-shaped appearance.

Fastener elements 74 (FIG. 6) and 90 (FIG. 7) are both suitable for engaging either loops or other fastener elements 74 and 90, respectively, to form fastenings. We believe that arrays of pyramid-type elements 90 may have certain advantages when engaging loops, as the corners formed at the lower edge of the head between adjacent sides help to snag loop fibers. Arrays of cone-type elements 74, on the other hand, may require lower forces to be engaged with similar arrays of elements, due in part to the lack of such corners. In either case, the details of the shape of the heads of the fastener elements may be readily optimized for different applications by varying the shape of the cavities in the post-forming roll and/or the dimensions of the preform stem.

For example, a quadra-lobal mushroom-type element 100 (FIG. 8) is produced by post-forming the distal end of a stem 102 having a "+"-shaped cross-section and four outwardly-projecting ridges 103. Even when post-formed with a head-forming cavity of conical shape, a head tends to be formed that has a downward-projecting lobe 104 corresponding to each outwardly-projecting edge of the stem. We believe that such multi-lobal fastening elements can produce very good fastening properties, especially when engaging loops, as the lobes tend to function as individual hooks for engaging loops in multiple directions.

Figure 8:
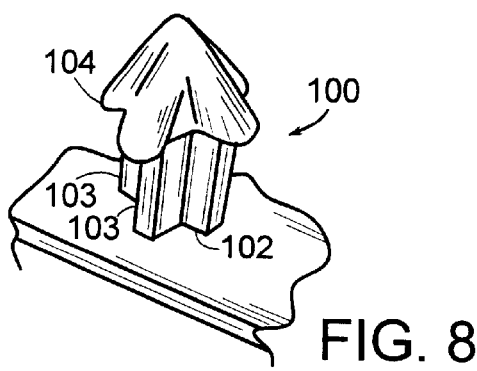
FIGS. 7 and 8 are enlarged perspective views of second and third fastener members, respectively.

As shown in FIGS. 6 through 8, fastening elements 74, 90 and 100 have generally pointed tops (e.g., apex 80 in FIG. 6) that can help to penetrate mating fibrous layers to engage fibers. The peak radius of apex 80, for instance, can be formed to be only about 0.002 inch or smaller by the method described herein.

Figure 9:
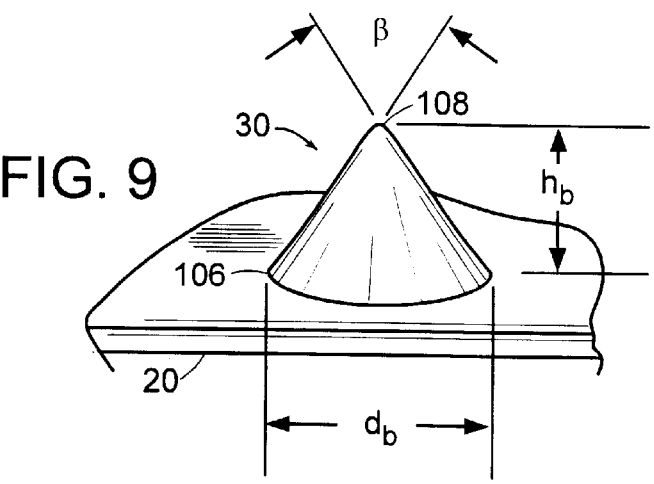
FIGS. 9 is a perspective view of a molded alignment feature.

An example of a registration bump 30 suitable for use in the embodiment of FIG. 1 is shown in FIG. 9. Bump 30 is generally of conical form, extending from a circular base 106 to a distal tip 108. Tip 108 defines an included angle β of about 90 degrees. Base 106 has a diameter $D_b$ of about 0.100 inch, resulting in an overall bump height $h_b$ of about 0.050 inch. For use with this form of bump, cavities 42 in roll 34 in FIG. 1 are also of generally conical shape to receive conical bumps 30 snugly.

Figure 10:
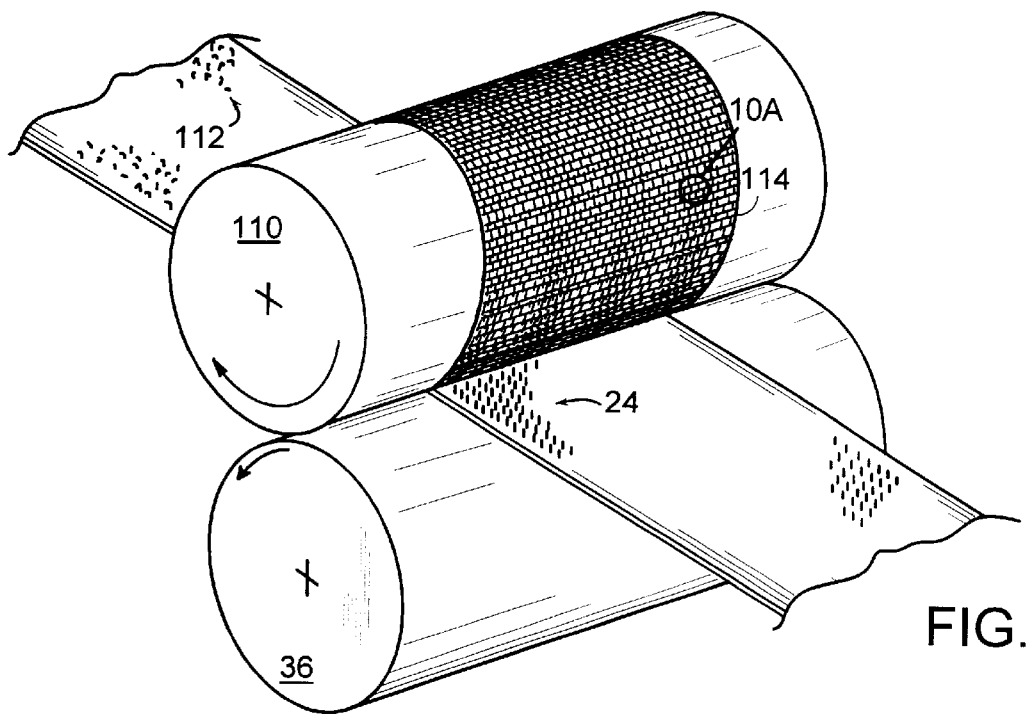
FIG. 10 illustrates non-aligned post-forming with a dimpled roll.
Figure 10A:
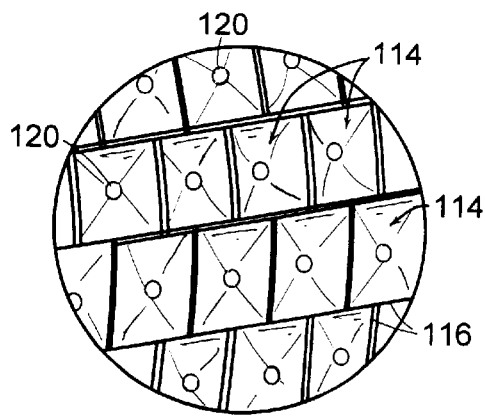
FIG. 10A is an enlarged view of area 10A in FIG. 10.
Figure 11:
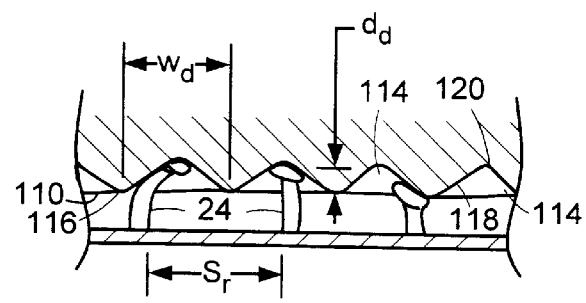
FIG. 11 is an enlarged, cross-sectional view along the post-forming nip of FIG. 10.

FIG. 10 shows a non-aligned method of post-forming upstanding stems 24 with a dimpled roll 110 to form useful fastener elements 112 of different shapes. Roll 110 preferably has an array of shallow dimples 114 about its periphery for intercepting and post-forming the distal ends of the stems. There is no attempt, in this approach, to force the alignment of dimples and incoming stems. Instead, a higher density of dimples than stems is provided, both in the machine and cross-machine directions, such that the stems of any given row are deflected in multiple directions, the deflected direction of any given stem being determined by what side of an intercepting dimple is contacted first. As seen in FIG. 10A, dimples 114 preferably extend into the heated roll from rectangular (e.g., square) bases, such that neighboring dimple bases are separated by only very thin edges 116 at the outer diameter of the roll and the dimple bases together occupy at least 90 percent of the circumferential area of the roll. This dimple construction reduces the percentage of stems that will hit the roll between dimples, as illustrated in FIG. 11. The spacing of the dimpled roll from the molded base, and the length of the incoming stems, should be selected to cause the distal ends of the stems to be deflected up the sides 118 of the dimples to the centers 120 of the dimples, where the stem ends can be post-formed to produce overhanging sides. Some of the stems will also be permanently bent by engaging dimple surfaces, producing hook-form fasteners capable of engaging and retaining loops. The resulting array of fastener elements face in random directions, and the individual elements are of different heights and shapes, providing a fastener element with omnidirectional performance characteristics. It is recommended that, for better randomization of stem deformation, that the mold plates of the mold roll be arranged to form stems that are not aligned in cross-machine rows, and that neighboring cross-machine rows of dimples of the post-forming roll be offset from each other as shown in FIG. 10, such that any given row of stems, in either direction, will be randomly deformed.

In the example illustrated in FIG. 11, dimples 114 for postforming rows of stems 24 with a row spacing $s_r$ of 0.016 inch have an overall depth $d_d$ of about 0.006 inch from the outer surface of the post-forming roll, and a square base width $w_d$ of about 0.010 inch. Preferably, the dimple depth and base width are less than about 0.5 and 0.8 times the stem row spacing, respectively. Such very small dimples can be formed by photo-chemically etching a cylindrical roll through an appropriate mask. For details on photo-chemical etching, see the technical paper published in 1976 by the Society of Manufacturing Engineers, entitled "Photo-Chemical Machining Fundamentals With Three Unique Applications" by Dr. R. J. Bennett; Photo Chemical Machine Institute publication no. PCMI1000, entitled "What is Photo Chemical Machining Process and What Can It Do For You?"; conference proceedings of The Society of Carbide and Tool Engineers cosponsored by Medicut Research Associates, Inc. and the Abrasive Engineering Society, entitled "Nontraditional Machining Conference Proceedings of the Conference Held Dec. 2 and 3, 1985"; and to the references cited in those papers.

Moldable materials suitable for use in the above method include polypropylenes, polyurethanes, nylons and ABS plastics. The speeds and mold temperatures should be adjusted as needed for a given material, to cause the stems to be properly post-formed without adhering to the post-forming roll.

Many other variations of the above embodiments will also be found to be within the scope of the appended claims. For instance, many configurations of stem cross-sections are enabled by the molding techniques described above, and can be employed to provide fastening elements of desired bending properties with low residual stresses. Many other head shapes are also moldable.

What is claimed is:

1. A method of producing a fastener product having a strip-form base and a multiplicity of fastening elements extending from a side of the strip-form base, the method comprising the steps of:

applying resin to a rotating mold roll, the mold roll having an outer surface for forming one side of the base and defining a multiplicity of cavities extending inward from the outer surface, under conditions which cause the resin to fill the cavities and form said side of the strip form base on the outer surface of the mold roll;

stripping from the mold roll a preform product having said strip-form base and a multiplicity of upstanding, preform stems formed in the cavities of the mold roll and extending from said side of the base; and registering a longitudinal position of the preform stems with a rotational position of a heading roll while passing the preform product against the heading roll to form, from resin of the stems, a head on each of the preform stems, to form said fastener elements, the heading roll defining a multiplicity of cavities about its periphery which receive the preform stems and form the heads to overhang sides of their stems in multiple directions to form mushroom fastener elements.

2. The method of claim 1 including molding a series of alignment features in the preform product with the mold roll, and then using the alignment features to longitudinally register the preform stems with the rotational position of the heading roll.

3. The method of claim 2 including, after the step of passing the preform product against the heading roll, trimming the strip-form base between the series of alignment features and the fastening elements to produce a strip-like fastener product without said alignment features.

4. The method of claim 2 including, after passing the preform product against the heading roll, trimming the strip-form base between the row of alignment features and the fastener elements to produce a strip-like fastener product without said alignment features.

5. The method of claim 1 wherein the step of registering comprises mechanically coupling a registration means on each of the mold and heading rolls to register the rotational position of the heading roll with respect to the mold roll.

6. The method of claim 1 wherein the step of registering comprises sensing a series of alignment features of the preform product.

7. The method of claim 6 wherein the alignment feature is sensed optically.

8. The method of claim 6 including, after passing the preform product against the heading roll, trimming the strip-form base between the series of alignment features and the fastening elements to produce a strip-like fastener product without said alignment features.

9. The method of claim 1 wherein the cavities of the heading roll are substantially of the shape of the formed heads.

10. The method of claim 9 wherein the formed, overhanging heads are of conical shape, having uppermost surfaces forming apices.

11. The method of claim 10 wherein the apices each define an included angle of less than about 90 degrees.

12. The method of claim 11 wherein the apices each define an included angle of less than about 60 degrees.

13. The method of claim 1 including maintaining the heading roll at an elevated temperature to soften distal ends of the stems of the preform product.

14. The method of claim 1 wherein the formed, overhanging heads each overhang their respective stems in elevational view by an overhang distance at least about 25 percent of the width of their respective stems.

15. The method of claim 14 wherein the formed, overhanging heads each overhang their respective stems in elevational view by an overhang distance at least about 50 percent of the width of their respective stems.

16. The method of claim 1 wherein the cavities of the mold roll comprise cylindrical holes extending inward from the surface of the mold roll.

17. The method of claim 1 wherein the cavities of the mold roll comprise axial slots extending between broad sides of disk-form mold plates stacked to form the mold roll.

18. The method of claim 1 wherein the cavities of the mold and heading rolls are adapted to form mushroom-type fastening elements with heads that overhang their stems generally equally in all directions.

19. The method of claim 1 wherein the cavities of the mold and heading rolls are adapted to form multi-lobal fastener elements with multiple, outwardly-projecting ridges extending along their stems, such that the stems have polygonal cross-sections, the heads having multiple, overhanging lobes corresponding to the ridges of the stems.

20. A method of producing a fastener product having a strip-form base and a multiplicity of fastening elements extending from a side of the strip-form base, the method comprising the steps of:

applying resin to a rotating mold roll, the mold roll having an outer surface for forming one side of the base and defining both a multiplicity of stem-forming cavities and a series of alignment feature-forming cavities extending inward from the outer surface, under conditions which cause the resin to fill the cavities and form said side of the strip-form base on the outer surface of the mold roll;

stripping from the mold roll a preform product having said strip-form base, a multiplicity of upstanding, preform stems formed in the stem-forming cavities of the mold roll and extending from said side of the base, and a row of alignment features formed in the alignment feature-forming cavities of the mold roll and extending from the base; and passing the preform product against a heading roll while employing the alignment features to register a longitudinal position of the preform stems with a rotational position of the heading roll, thereby forming a head on each of the preform stems from resin of the stems, to form said fastener elements.

21. The method of claim 20 wherein the longitudinal position of the preform product is registered with a rotational position of the heading roll by sensing the alignment features.

22. The method of claim 21 wherein the alignment features are sensed optically.

23. The method of claim 20 wherein the heads are formed on the preform stems in heading roll cavities of substantially the shape of the formed heads.

24. The method of claim 23 wherein the formed, overhanging heads are of conical shape, having uppermost surfaces forming apices.

25. The method of claim 24 wherein the apices each define an included angle of less than about 90 degrees.

26. The method of claim 25 wherein the apices each define an included angle of less than about 60 degrees.

27. The method of claim 20 including maintaining the heading roll at an elevated temperature to soften distal ends of the stems of the preform product.

28. The method of claim 20 wherein the step of passing the preform product against the heading roll forms overhanging heads which overhang their respective stems in elevational view by an overhang distance at least about 25 percent of the width of their respective stems.

29. The method of claim 28 wherein the step of passing the preform product against the heading roll forms overhanging heads which overhang their respective stems in elevational view by an overhang distance at least about 50 percent of the width of their respective stems.

30. The method of claim 20 wherein the cavities of the mold roll comprise cylindrical holes extending inward from the surface of the mold roll.

31. The method of claim 20 wherein the cavities of the mold roll comprise axial slots extending between broad sides of disk-form mold plates stacked to form the mold roll.

32. A method of producing a fastener product having a strip-form base and a multiplicity of fastening elements extending from a side of the strip-form base, the method comprising the steps of:

applying resin to a rotating mold roll, the mold roll having an outer surface for forming one side of the base and defining a multiplicity of cavities extending inward from the outer surface, under conditions which cause the resin to fill the cavities and form said side of the strip-form base on the outer surface of the mold roll;

stripping from the mold roll a preform product having said strip-form base and a multiplicity of upstanding, preform stems formed in the cavities of the mold roll and extending from said side of the base, the stems arranged in spaced, parallel rows extending in the machine direction; and passing the preform product against a heading roll to form, from resin of the stems, a head on each of the preform stems, to form said fastener elements, the heading roll defining a multiplicity of cavities about its periphery which receive the preform stems and form the heads to overhang sides of their stems in multiple directions, the cavities of the heading roll being arranged to randomly intercept the preform stems and to, in addition to forming the overhanging heads, bend at least some of the stems in different directions, the cavities of the heading roll having an overall depth of less than about 0.5 times the spacing between adjacent, machine direction rows of stems.

33. A method of producing a fastener product having a strip-form base and a multiplicity of fastening elements extending from a side of the strip-form base, the method comprising the steps of:

applying resin to a rotating mold roll, the mold roll having an outer surface for forming one side of the base and defining a multiplicity of cavities extending inward from the outer surface, under conditions which cause the resin to fill the cavities and form said side of the strip-form base on the outer surface of the mold roll;

stripping from the mold roll a preform product having said strip-form base and a multiplicity of upstanding, preform stems formed in the cavities of the mold roll and extending from said side of the base, the stems arranged in spaced, parallel rows extending in the machine direction; and passing the preform product against a heading roll to form, from resin of the stems, a head on each of the preform stems, to form said fastener elements, the heading roll defining a multiplicity of cavities about its periphery which receive the preform stems and form the heads to overhang sides of their stems in multiple directions, the cavities of the heading roll being arranged to randomly intercept the preform stems and to, in addition to forming the overhanging heads, bend at least some of the stems in different directions, adjacent cavities of the heading roll being spaced at a cavity spacing distance of less than about 0.8 times the spacing between adjacent, machine direction rows of stems.

34. The method of claim 33 including maintaining the heading roll at an elevated temperature to soften distal ends of the stems of the preform product.

35. The method of claim 33 wherein the step of passing the preform product against the heading roll forms overhanging heads which overhang their respective stems in elevational view by an overhang distance at least about 25 percent of the width of their respective stems.

36. The method of claim 35 wherein the step of passing the preform product against the heading roll forms overhanging heads which overhang their respective stems in elevational view by an overhang distance at least about 50 percent of the width of their respective stems.

37. The method of claim 33 wherein the cavities of the mold roll comprise cylindrical holes extending inward from the surface of the mold roll.

38. The method of claim 33 wherein the cavities of the mold roll comprise axial slots extending between broad sides of disk-form mold plates stacked to form the mold roll.

39. The method of claim 33 wherein at least some of the preform stems are bent by the heading roll to form hook-shape fastener elements, and at least some of the preform stems are headed by the heading roll without being bent.

40. The method of claim 33 wherein the cavities of the heading roll have an overall depth of less than about 0.5 times the spacing between adjacent, machine direction rows of stems.

41. The method of claim 33 wherein the cavities of the heading roll define a cavity portion of the heading roll, the heading roll cavities extending into the heading roll from rectangular bases, the bases of the heading roll occupying at least 90 percent of the circumferential area of the heading roll along the length of the cavity portion of the heading roll.

* * * * *